United States Patent [19]

Jackson

[11] 3,888,870

[45] June 10, 1975

[54] 2-SULFINYL-THIAZOLES AND OXAZOLES

[75] Inventor: Thomas E. Jackson, Madison, N.J.

[73] Assignee: Sandoz, Inc., E. Hanover, N.J.

[22] Filed: Mar. 8, 1974

[21] Appl. No.: 449,511

[52] U.S. Cl. ............... 260/302 S; 429/270; 429/272
[51] Int. Cl. ...................... C07d 91/32; C07d 85/44
[58] Field of Search ..................... 260/302 S, 307 R

[56] References Cited
UNITED STATES PATENTS 3,288,860  11/1966  Lyngss et al. ................... 260/307 R
3,668,212  6/1972  Shgn et al. ....................... 260/302 S Primary Examiner—Richard J. Gallagher
Attorney, Agent, or Firm—Gerald D. Sharkin; Richard E. Vila; Joseph J. Borovian

[57] ABSTRACT

The invention discloses 2-sulfinyl-thiazoles and oxazoles having pharmacological activity in animals and useful as CNS depressant agents. The compounds may be prepared by reacting either a 2-alkythio-thiazole or a 2-alkylthio-oxazole with an equimolar amount of a peracid in the presence of an inert, organic solvent.

12 Claims, No Drawings

2-SULFINYL-THIAZOLES AND OXAZOLES

The present invention relates to chemical compounds and their use as pharmaceutical agents, and more particularly, to 2-sulfinyl-thiazole and 2-sulfinyl oxazole derivatives and their use as CNS depressants, e.g., tranquilizer agents.

The compounds which are the subject of the present invention may be represented by the following structural formula I:

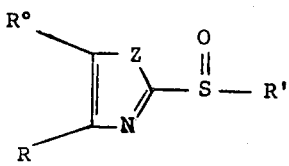

wherein

R° and R are independently hydrogen, lower alkyl of 1 to 4 carbon atoms or phenyl of the formula:

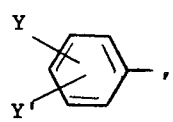

where Y and Y' are independently hydrogen, halo of atomic weight of from 18 to 80, lower alkyl of 1 to 4 carbon atoms, lower alkoxy of 1 to 4 carbon atoms or trifluoromethyl, R' is alkyl of 1 to 6 carbon atoms, and Z is an oxygen or a sulfur atom, with the proviso that at least one of R° and R is phenyl as defined above.

The compounds of formula I may be prepared by the following reaction scheme:

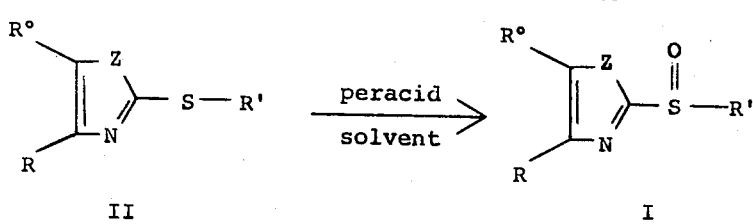

wherein R°, R, R' and Z are as defined above.

The preparation of compounds of formula I involves the reaction of a 2-alkylthio-thiazole or a 2-alkylthio-oxazole of formula II above with not more than an equimolar amount of a peracid, e.g., m-chloroperoxybenzoic acid, in the presence of an inert, organic solvent which is adapted to dissolving the reactants and product compounds of formula I. Suitable solvents are known and available, and include by way of illustration, the chlorinated hydrocarbons, nitrated hydrocarbons, e.g., nitromethane, lower alkanols, e.g., ethanol, and ethers, e.g., dioxane, tetrahydrofuran, etc. The reaction is preferably effected in the presence of a chlorinated hydrocarbon, e.g., methylene chloride. The reaction may be carried out at temperatures in the range of from −20°C. to 70°C., preferably −5°C. to 25°C., and most preferably, between 0°C. and 10°C. The reaction product of formula I may be isolated from the reaction mixture by working up by conventional techniques.

The compounds of formula II are either known or can be prepared in conventional manner from available materials, e.g., by the procedures of Kjellin & Sandstrom, Acta Chem. Scand., 23, 2879-2887 (1969).

The compounds of formula I are useful because they possess pharmacological activity in animals. In particular, the compounds effect a depression of the central nervous system and are useful as minor tranquilizers and sedative/hypnotic agents as indicated by their ability to produce docility in behavior tests in mice given 10 to 200 mg./kg. i.p. of test compound according to the 30-word adjective check sheet system, basically described by S. Irwin, Gordon Research Conference, Medicinal Chemistry, 1949 and Chem. Symposium on Sedative and Hypnotic Drugs, Williams and Wilkins, 1954 and the hexobarbital reinduction method of Winter, J. Pharmacol. and Exp. Therap., 94, 7-11, 1948. For such uses, the compounds may be administered orally or parenterally, preferably orally, and in admixture with conventional pharmaceutical carriers. The dosage administered may vary depending upon known variables such as the particular compound employed and the severity of the condition being treated. In general, satisfactory results are obtained when administered at a daily dosage of from about 4 milligrams to about 200 milligrams per kilogram of animal body weight, preferably given orally and in a single dose or in divided doses, two to four times a day. For most mammals, the total daily dosage is from about 300 milligrams to about 1600 milligrams of the compound with a single dose of from 600 to 1600 milligrams being given at bedtime for sedative/hypnotic use. For use as tranquilizers, the compounds of formula I are given in divided doses of from 75 to 800 milligrams, preferably 75 to 400 milligrams four times a day. The compounds of formula I are suitably administered in admixture with a solid or liquid pharmaceutically acceptable carrier or diluent.

For above uses, the compounds of structural formula I may be administered orally in such forms as tablets, dispersible powders, granules, capsules, syrups and elixirs; and parenterally as solutions, suspensions, dispersions, emulsions, and the like, e.g., a sterile injectable solution such as an aqueous suspension. These pharmaceutical preparations may contain 0.5 percent up to about 90 percent of the active ingredient in combination with the carrier or adjuvant, more usually between 3 percent and 50 percent by weight. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium phosphate, calcium sulphate dihydrate, lactose and talc, granulating and disintegrating agents, e.g., starch and alginic acid, binding agents, e.g., starch, gelatin, polyvinyl pyrrolidone and acacia, and lubricating agents, e.g., magnesium sterate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert liquid or solid diluent, e.g., calcium carbonate, calcium phosphate, kaolin, peanut oil, sesame oil and corn oil. The preferred pharmaceutical compositions from the standpoint of preparation and ease of administration are solid compositions, particularly hard-filled capsules and tablets.

Tablets and capsules containing the ingredients below may be prepared by conventional techniques and are useful in effecting tranquilization at a dose of one tablet or capsule two to four times a day.

| Ingredient | Weight (mg.) Tablet | Capsule |
| --- | --- | --- |
| 2-methylsulfinyl-4-phenyl-thiazole | 200 | 200 |
| tragacanth | 10 | |
| lactose | 247.5 | 300 |
| corn starch | 25 | |
| talcum | 15 | |
| magnesium stearate | 2.5 | |
| Total | 500 mg. | 500 mg. |

EXAMPLE 1

2-methylsulfinyl-4-phenyl-thiazole.

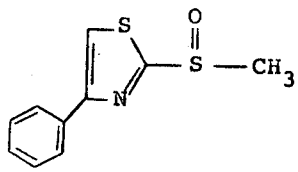

To a cooled (ice/water) solution of 8.9 g. of 2-methylthio-4-phenyl-thiazole pre-dissolved in 90 ml. of methylene chloride is added in portions over 5 minutes, 8.7 g. of m-chloro-peroxybenzoic acid. Examination by TLC after 90 minutes indicates the presence of essentially all of the sulfinyl compound (reaction complete) with a faint trace of sulfone and an even fainter trace of remaining thiazole starting material. The precipitated m-chlorobenzoic acid is filtered off and the methylene chloride solution is washed successively with a 10 percent solution of sodium sulfite and with saturated sodium bicarbonate solution, dried, evaporated in vacuo to dryness and the residue further dried overnight in vacuo, to yield 2-methylsulfinyl-4-phenyl-thiazole, m.p. 104°–105°C.

EXAMPLE 2

2-methylsulfinyl-4,5-diphenyl-thiazole.

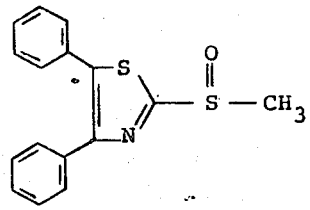

To a cooled (ice/water) solution of 1.1 g. of 2-methylthio-4,5-diphenyl-thiazole pre-dissolved in 15 ml. of methylene chloride is added in portions over 5 minutes, 0.8 g. of m-chloro-peroxybenzoic acid. Examination by TLC after 30 minutes indicates the presence of essentially all of the sulfinyl compound (reaction complete). The precipitated m-chloro-benzoic acid is filtered off and the methylene chloride solution is washed successively with a 10 percent solution of sodium bisulfite and with saturated sodium bicarbonate solution, dried, evaporated in vacuo to dryness and the residue further dried overnight in vacuo to yield 2-methylsulfinyl-4,5-diphenyl-thiazole, m.p. 102°–103°C.

EXAMPLE 3

Following essentially the procedure of Example 1, and using in place of 2-methylthio-4-phenyl-thiazole, an equimolar amount of:
a. 2-methylthio-5-phenyl-thiazole,
b. 2-methylthio-5-methyl-4-phenyl-thiazole,
c. 2-methylthio-4-methyl-5-phenyl-thiazole,
d. 2-ethylthio-4-phenyl-thiazole,
e. 2-ethylthio-4,5-diphenyl-thiazole,
f. 2-ethylthio-5-phenyl-thiazole,
g. 2-ethylthio-5-methyl-4-phenyl-thiazole, and
h. 2-ethylthio-4-methyl-5-phenyl-thiazole, there is obtained
a. 2-methylsulfinyl-5-phenyl-thiazole,
b. 2-methylsulfinyl-5-methyl-4-phenyl-thiazole,
c. 2-methylsulfinyl-4-methyl-5-phenyl-thiazole,
d. 2-ethylsulfinyl-4-phenyl-thiazole,
e. 2-ethylsulfinyl-4,5-diphenyl-thiazole,
f. 2-ethylsulfinyl-5-phenyl-thiazole,
g. 2-ethylsulfinyl-5-methyl-4-phenyl-thiazole, and
h. 2-ethylsulfinyl-4-methyl-5-phenyl-thiazole, respectively.

EXAMPLE 4

2-methylsulfinyl-4,5-diphenyl-oxazole.

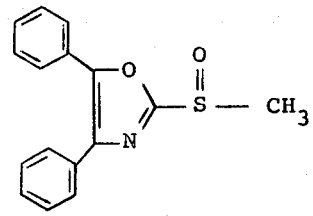

To a cooled (ice/water) solution of 5.21 g. of 2-methylthio-4,5-diphenyl-oxazole pre-dissolved in 50 ml. of chloroform is added in portions over 5 minutes, 4.35 g. of m-chloro-peroxybenzoic acid dissolved in 50 ml. of chloroform. After stirring the reaction mixture for 20 minutes, the ice/water bath is removed and the reaction mixture stirred at room temperature for an additional 60 minutes. The precipitated m-chloro-benzoic acid is filtered off, washed with chloroform and the combined chloroform solution is washed with a 10% solution of sodium carbonate, dried, evaporated in vacuo to dryness, and the residue recrystallized from benzene/ligroin to yield 2-methylsulfinyl-4,5-diphenyl-oxazole, m.p. 75°–78°C.

EXAMPLE 5

2-ethylsulfinyl-4,5-diphenyl-oxazole.

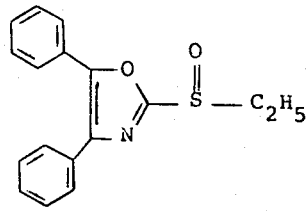

To a cooled (ice/water) solution of 4.2 g. of 2-ethylthio-4,5-diphenyl-oxazole pre-dissolved in 30 ml. of methylene chloride is added in portions over 5 minutes, 30 g. of m-chloro-peroxybenzoic acid. Examination by TLC after 2 hours indicates the presence of essentially all of the sulfinyl compound (reaction complete). The precipitated m-chloro-benzoic acid is filtered off and the methylene chloride solution is washed successively with a 10 percent solution of sodium sulfite and with saturated sodium bicarbonate solution, dried, evaporated in vacuo to dryness, and the residue further dried overnight in vacuo to yield 2-ethylsulfinyl-4,5-diphenyl-oxazole, m.p. 133°–134°C.

EXAMPLE 6

Following essentially the procedure of Example 5, and using in place of 2-ethylthio-4,5-diphenyl-oxazole, an equimolar amount of:
a. 2-n-butylthio-4,5-diphenyl-oxazole,
b. 2-methylthio-5-phenyl-oxazole,
c. 2-methylthio-4-phenyl-oxazole,
d. 2-methylthio-5-methyl-4-phenyl-oxazole,
e. 2-methylthio-4-methyl-5-phenyl-oxazole,
f. 2-ethylthio-4-phenyl-oxazole,
g. 2-ethylthio-5-phenyl-oxazole,
h. 2-ethylthio-5-methyl-4-phenyl-oxazole, and
i. 2-ethylthio-4-methyl-5-phenyl-oxazole, there is obtained
a. 2-n-butylsulfinyl-4,5-diphenyl-oxazole,
b. 2-methylsulfinyl-5-phenyl-oxazole,
c. 2-methylsulfinyl-4-phenyl-oxazole,
d. 2-emthylsulfinyl-5-methyl-4-phenyl-oxazole,
e. 2-methylsulfinyl-4-methyl-5-phenyl-oxazole,
f. 2-ethylsulfinyl-4-phenyl-oxazole,
g. 2-ethylsulfinyl-5-phenyl-oxazole,
h. 2-ethylsulfinyl-5-methyl-4-phenyl-oxazole, and
i. 2-ethylsulfinyl-4-methyl-5-phenyl-oxazole, respectively.

What is claimed is:

1. A compound of the formula:

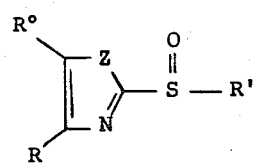

wherein
$R°$ and $R$ are independently hydrogen, lower alkyl of 1 to 4 carbon atoms or phenyl of the formula:

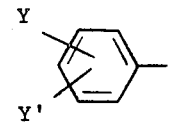

where $Y$ and $Y'$ are independently hydrogen, halo of atomic weight of from 18 to 80, lower alkyl of 1 to 4 carbon atoms, lower alkoxy of 1 to 4 carbon atoms or trifluoromethyl,
$R'$ is alkyl of 1 to 6 carbon atoms, and
$Z$ is an oxygen or a sulfur atom, with the proviso that at least one of $R°$ and $R$ is phenyl as defined above.

2. The compoud of claim 1 having the formula:

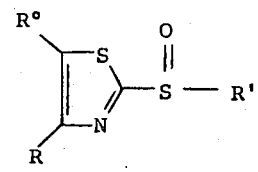

wherein
$R°$, $R$ and $R'$ are as defined in claim 1.

3. The compound of claim 2 having the formula:

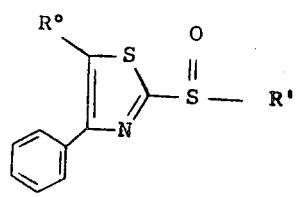

wherein
$R°$ and $R'$ are as defined in claim 2.

4. The compound of claim 2 having the formula:

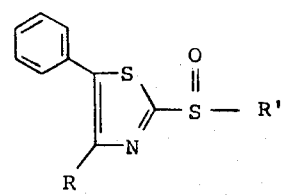

wherein
$R$ and $R'$ are as defined in claim 2.

5. The compound of claim 2 which is 2-methylsulfinyl-4-phenyl-thiazole.

6. The compound of claim 2 which is 2-methylsulfinyl-4,5-diphenyl-thiazole.

7. The compound of claim 1 having the formula:

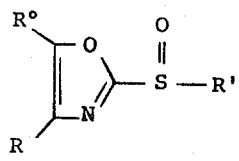

wherein
$R°$, $R$ and $R'$ are as defined in claim 1.

8. The compound of claim 7 having the formula:

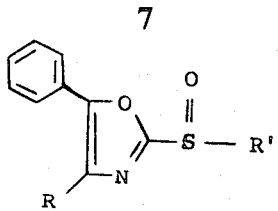
wherein
R and R' are as defined in claim 7.
9. The compound of claim 7 having the formula:
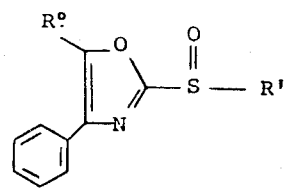
wherein
R° and R' are as defined in claim 7.
10. The compound of claim 7 having the formula:
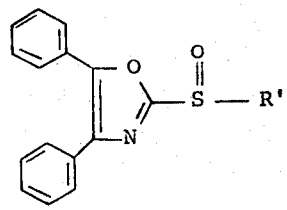
wherein
R' is as defined in claim 7.
11. The compound of claim 7 which is 2-methylsulfinyl-4,5-diphenyl-oxazole.
12. The compound of claim 7 which is 2-ethylsulfinyl-4,5-diphenyl-oxazole.
* * * * *